US006959744B2

(12) United States Patent
Sandstrom et al.

(10) Patent No.: US 6,959,744 B2
(45) Date of Patent: Nov. 1, 2005

(54) TIRE WITH RUBBER TREAD OF DIVERSE ZONED RUBBER COMPOSITIONS

(75) Inventors: Paul Harry Sandstrom, Cuyahoga Falls, OH (US); Henry Claude Young, Jr., Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 278 days.

(21) Appl. No.: 10/325,568

(22) Filed: Dec. 20, 2002

(65) Prior Publication Data

US 2004/0118495 A1 Jun. 24, 2004

(51) Int. Cl.$^7$ ............................. B60C 1/00; B60C 11/00
(52) U.S. Cl. ................................ 152/209.5; 152/209.18
(58) Field of Search ........................... 152/152.1, 154.2, 152/209.5, DIG. 2, 209.18

(56) References Cited

U.S. PATENT DOCUMENTS

| 4,319,620 | A | | 3/1982 | Knill ........................... 152/209 |
| 5,082,901 | A | * | 1/1992 | Linster ........................ 525/237 |
| 5,225,011 | A | | 7/1993 | Takino et al. ................ 152/209 |
| 5,937,926 | A | * | 8/1999 | Powell ...................... 152/209.5 |
| 6,044,882 | A | * | 4/2000 | Crawford et al. .......... 152/209.5 |
| 6,046,266 | A | * | 4/2000 | Sandstrom et al. .......... 524/492 |
| 6,474,382 | B1 | | 11/2002 | Finck ........................ 152/209.5 |
| 6,523,585 | B1 | * | 2/2003 | Ducci et al. ............... 152/209.5 |
| 2002/0033212 | A1 | | 3/2002 | Caretta et al. ............ 152/209.5 |
| 2004/0112490 | A1 | * | 6/2004 | Sandstrom ................ 152/209.5 |

FOREIGN PATENT DOCUMENTS

| EP | 341187 | * | 11/1989 | |
| EP | 662396 | | 7/1995 | ............. B60C/1/00 |
| EP | 738613 | * | 10/1996 | |
| EP | 839675 | | 5/1998 | ........... B60C/19/08 |
| EP | 864446 | | 9/1998 | ........... B60C/11/03 |
| EP | 864446 | | 4/2002 | ........... B60C/11/03 |
| EP | 1308319 | | 5/2003 | ........... B60C/11/18 |
| JP | 62-59105 | * | 3/1987 | |
| JP | 9-328579 | * | 12/1997 | |
| JP | 2004-47815 | * | 2/2001 | |
| WO | 0037270 | | 6/2000 | ........... B60C/11/03 |

OTHER PUBLICATIONS

Abstract for Europe 839675.*
Abstract for Europe 1308319.*
European Search Report.

* cited by examiner

*Primary Examiner*—Steven D. Maki
(74) *Attorney, Agent, or Firm*—Henry C. Young, Jr.

(57) ABSTRACT

The invention relates to a tire having a rubber tread comprised of cap/base construction where the tread cap layer is the running surface of the tread having a lug and groove configuration and the tread base layer underlies the tread cap layer wherein the base layer provides a transition zone between the tread cap layer and the remainder of the tire carcass and is not intended to be ground-contacting. For this invention, the tread cap layer is comprised of three distinct load-bearing zones which contain reinforcing fillers selected from precipitated silica and carbon black, namely a circumferential annular central zone of a rubber composition to promote traction for the running surface of the tread, wherein the central zone is positioned between two lateral and peripheral circumferential annular zones of a rubber composition to promote resistance to tread wear for the running surface of the tread. In one aspect, the zoned rubber tread cap layer and rubber tread base layer are co-extruded together to form an integral tread rubber composite.

Figure 1:
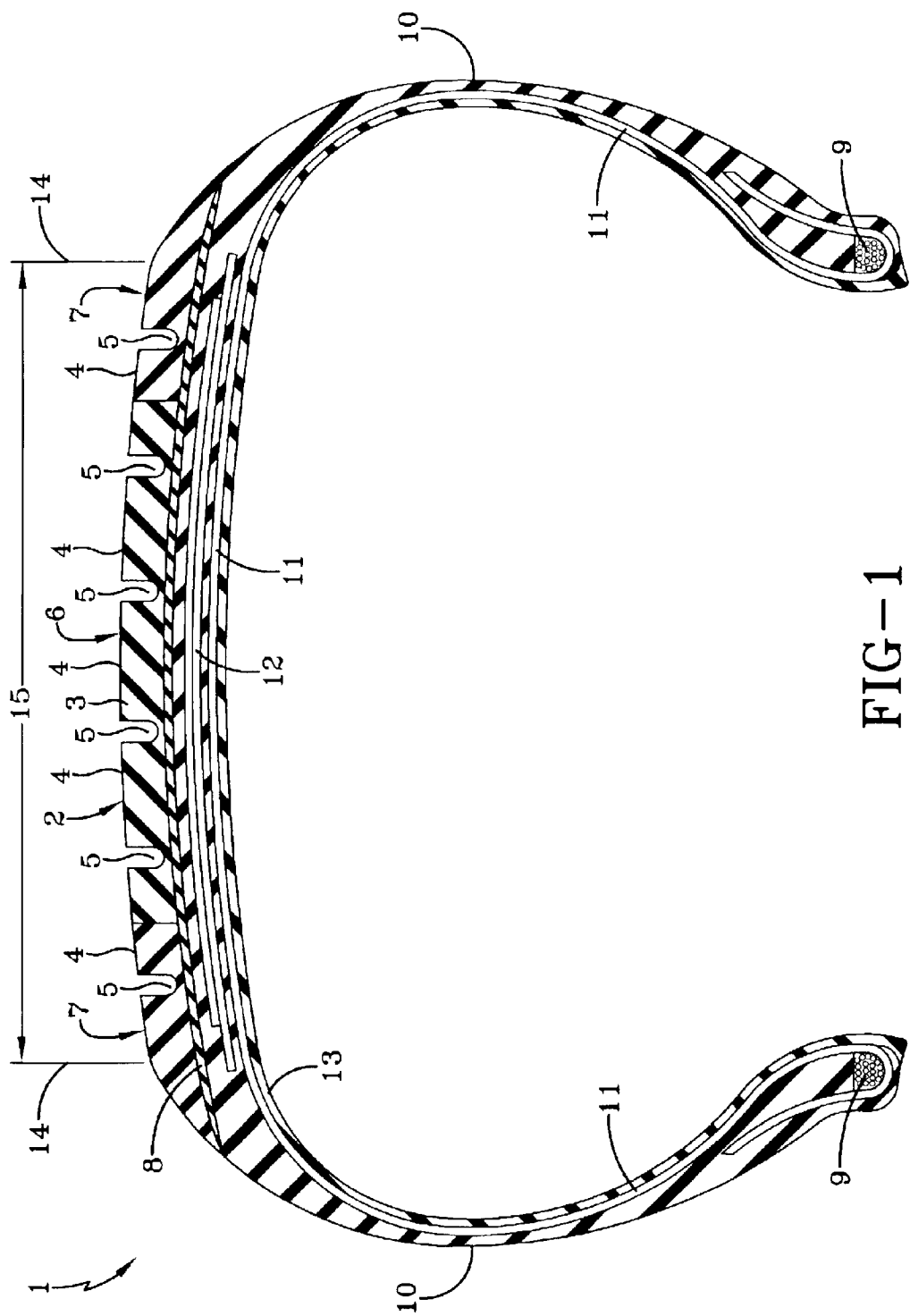

19 Claims, 1 Drawing Sheet

TIRE WITH RUBBER TREAD OF DIVERSE ZONED RUBBER COMPOSITIONS

FIELD OF THE INVENTION

The invention relates to a tire having a rubber tread comprised of cap/base construction where the tread cap layer is the running surface of the tread having a lug and groove configuration and the tread base layer underlies the tread cap layer wherein the base layer provides a transition zone between the tread cap layer and the remainder of the tire carcass and is not intended to be ground-contacting. For this invention, the tread cap layer is comprised of three distinct load-bearing zones which contain reinforcing fillers selected from precipitated silica and carbon black, namely a circumferential annular central zone of a rubber composition to promote traction for the running surface of the tread, wherein the central zone is positioned between two lateral and peripheral circumferential annular zones of a rubber composition to promote resistance to tread wear for the running surface of the tread. In one aspect, the zoned rubber tread cap layer and rubber tread base layer are co-extruded together to form an integral tread rubber composite.

BACKGROUND FOR THE INVENTION

Tire treads for pneumatic tires typically have running surfaces of consistent rubber properties across the face of the tread intended to be ground contacting.

In particular, the rubber composition for the running surface is often optimized for a combination of acceptable traction, acceptable rolling resistance and acceptable resistance to tread wear. It is known that providing a tread rubber composition more optimized in a direction of one of such properties usually sacrifices, at least to some degree, the value of at least one of the two remaining properties.

It is to be appreciated that sometimes the peripheral, or lateral, portions of the running surface of the tread may tend to experience a greater rate of wear than the more central portion of the tread running surface, particularly for front vehicular tires which typically experience greater wear due to increased steering and cornering maneuvers.

For this invention, it is contemplated that a tread running surface is provided as a tread cap layer composed of a central zone positioned between two lateral zones located at the peripheral portion of the tread running surface, wherein the lateral zones are of a rubber composition more optimized for resistance to abrasion, or treadwear for the tire tread, and the central zone is of a rubber composition more optimized for presenting tread traction and less optimized for resistance to abrasion, or treadwear for the tire tread.

Historically, pneumatic tires often have a rubber tread of a cap/base construction where the tread cap layer is the running surface of the tire and is typically of a lug and groove configuration. Such historical tread cap layer may, for example, be comprised of a carbon-black rich or a silica-rich rubber composition.

The tread base layer underlies the tread cap layer, is not intended to be ground-contacting, and typically is of a carbon black-rich rubber composition. The tread base layer is normally intended to provide a transition between the tread cap layer and the tire carcass. Such cap/base tire tread construction and such lug and groove configuration for a tread cap as a running surface of the tread are well known to those having skill in such art.

Historically, a tire tread has heretofore been suggested having a running surface composed of three longitudinal portions namely, two black colored lateral portions and a non-black colored central portion located between the two black portions, wherein the lateral black colored portions have wear resistant properties virtually identical to the central colored portion (EP 0 993 381 A3, FR 2765525 and WO 99/01299 patent publications).

Such tire tread running surface is contrary to the present invention. For this invention, it is desired to provide a tire tread of three significantly wide, distinct load-bearing zones, of significantly different compositions, each of which contain carbon black reinforcement and are thereby black in color.

Historically, U.S. Pat. No. 5,225,011 relates to a tire having a tread composed of a center rubber composition and side rubbers (FIG. 1) positioned directly onto a tire carcass belt without a tread base transition layer. The center rubber is required to be limited to either natural rubber or a natural rubber/styrene-butadiene rubber blend. The center rubber contains a carbon black of large iodine absorption number of at least 100 mg/g, silica and silane coupling agent and the side rubbers are required to be of a different rubber composition.

Historically, European patent publication number EP 864, 446 A1 relates to a tire having a tread (FIG. 2) with a central portion (B) and side portions (A) positioned directly onto a tire carcass belt without a tread base transition layer. The side portions are carbon black rich and the central portion is silica rich, wherein the silica content of the central portion (B) is at least 20 percent higher than in the side portions (A).

For the zoned tread cap layer of this invention, by requiring the tread cap zones to be load-bearing, it is meant that each of the three distinct tread running surface tread cap zones extend radially inward from the outer surface of the tread to the underlying carbon black-rich tread base rubber composition so that all of the load on the tire is communicated by the tread cap layer zones directly to the tread base layer instead of directly to remainder of the tire carcass itself.

By requiring that each of the running surface tread zones be significantly wide, and therefore each comprising a significant portion of the tread running surface, it is intended that each respective zone more effectively transmits the load from the outer surface of the running surface of the tire directly radially inward to the supportive tread base layer. For such proposes of this invention, the central zone is intended to span from about 55 to about 80 percent of the axial width of the tread cap and the two lateral, or peripheral, zones, are intended to collectively and correspondingly span from about 20 to about to about 45 percent of the axial width of the tread cap. Such span of the tread running surface is the surface of the tread lugs of the tread cap layer intended to be ground-contacting and tread grooves included between the tread lugs.

For this invention, a central tread cap zone is provided for the running surface of the tire which may be comprised of a silica-rich, carbon black-containing rubber composition.

The central tread cap zone is positioned between two lateral, or peripheral, circumferential, rubber composition zones which contain reinforcement filler as both carbon black and precipitated silica reinforcement, one lateral zone on either side of the central zone, which are also a portion of the running surface of the tire tread.

For this invention, the rubber composition for the two lateral tread cap zones has a significantly greater resistance to abrasion, according to DIN 53516 (23° C.), than the rubber composition of the central tread cap zone and therefore a greater predictive resistance to treadwear for the respective lateral tread cap zone components of the tire tread.

For this invention, the rubber composition for said central tread cap zone is intended to have a significantly higher tan delta value at 0° C. than the rubber composition for the two respective lateral tread cap zones. A relatively higher tan delta value for a central tread cap zone rubber composition at 0° C., and at the indicated low strain, is considered herein as being predictive of a comparatively increased wet traction value for the central tread cap zone component of the tire tread.

For this invention, the rubber composition for the central tread cap zone is to have a low strain modulus G' value, at 10 percent strain, 30° C. and 10 Hertz, which is lower than the low strain modulus G' value of the rubber composition of the associated two lateral tread cap zone components of the tire tread. The lower G' value for the rubber composition of the central tread cap zone is indicative of having a lower resistance to abrasion as compared to the lateral tread cap zones which should have higher G' values which is indicative to a higher resistance to abrasion.

It is considered herein that both a balance of tire tread cap layer rubber composition properties, namely the DIN abrasion, tan delta and low strain modulus properties in combination of allocating such rubber compositions between a central tread cap zone and the two associated lateral tread cap zones for the running surface of the tire, provides a tire tread with a relatively beneficial combination of comparative enhanced resistance to treadwear for the lateral tread cap zones and comparative enhanced traction for the central tread cap zone, particularly for use as vehicular front wheel driven vehicular tires.

Therefore, a purpose of such tread cap zone configuration is to provide a running surface for a tire composed of the three circumferential load bearing zones in which the rubber composition for the central tread cap zone is intended to provide relatively enhanced traction, or skid resistance, for the tire tread and the rubber composition for the two associated tread cap lateral zones is intended to provide relatively enhanced resistance to abrasion, or treadwear for the tire. Such purpose is based upon an observation, other things being equal, that the lateral portions of a tire tread running surface often tend to wear at a greater rate than its central portion and, also, that resistance to skidding of the tire is often primarily focused upon, or relied upon, by the central portion of the running surface of the tread. Accordingly, it is an aspect of this invention to provide a suitable balance of rubber compositions between tire tread cap central and lateral zones in a manner of a departure from past practice.

The rubber compositions of the central and lateral tread cap zones are comprised of different combinations of elastomers. In particular, the lateral tread cap zones are comprised of elastomers of a combination of restrictive glass transition temperatures (Tg's) which is different than the overall elastomer Tg restrictions for the elastomers of the central cap zone.

The tread cap lateral zone rubber composition is required to contain both precipitated silica and rubber reinforcing carbon black reinforcement. The central tread cap zone is required to be silica rich by containing both precipitated silica and rubber reinforcing carbon black reinforcement silica with the silica content being greater than the carbon black content.

In the description of this invention, the terms "rubber" and "elastomer" where herein, are used interchangeably, unless otherwise provided. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise provided. The terms "cure" and "vulcanize" may be used interchangeably unless otherwise provided.

In the description of this invention, the glass transition temperature (Tg) may be determined according to differential scanning calorimeter (DSC) analysis at a heating rate of 10° C. per minute.

SUMMARY AND PRACTICE OF THE INVENTION

In accordance with this invention, a tire is provided having a rubber tread of a co-extruded cap/base layered construction, wherein said tread cap layer is of a lug and groove configuration as a running surface of the tread, wherein said tread base layer underlies said tread cap and is comprised of a carbon black-rich rubber composition and wherein said tread cap is comprised of three distinct, circumferential zones, wherein said tread cap zones are comprised of a central tread zone positioned between two lateral tread zones, wherein said tread zones extend radially inward from the running surface of the tread to said tread base layer, wherein, based upon parts by weight per 100 parts by weight rubber (phr)

(A) said tread base layer is comprised of at least one conjugated diene-based elastomer and from about 30 to about 70 phr of rubber reinforcing filler selected from carbon black and precipitated silica wherein said filler is comprised of from about 30 to about 70, alternately from about 25 to about 65, phr of said carbon black and from zero to 25, alternately about 5 to about 20, phr of said precipitated silica, (thus, in one aspect, the rubber reinforcing filler may be entirely rubber reinforcing carbon black); and wherein (B) said lateral tread cap zones are comprised of:
  (1) 100 phr of at least one diene-based elastomers having a Tg between −50° C. and −110° C. and exclusive of elastomers having a Tg higher than −50° C., wherein said elastomers comprised of from 50 to 90 phr of cis 11,4-polybutadiene rubber, from 10 to 50 phr of cis 1,4-polyisoprene rubber, preferably natural cis 1,4-polyisoprene rubber; and from zero to 20, alternately from about 5 to about 15, phr of at least one additional diene-based elastomer selected from at least one of styrene/butadiene rubber, isoprene/butadiene rubber, trans 1,4-polybutadiene, low vinyl polybutadiene having vinyl content in a range of 10 to about 40 percent, and styrene/isoprene/butadiene rubber, so long as said additional elastomers have a Tg within a range of −50° C. and −110° C.;
  (2) about 30 to about 100 phr of reinforcing filler comprised of about 20 to about 80 phr of rubber reinforcing carbon black and from 10 to about 40 phr of precipitated silica, wherein the weight ratio of silica to carbon black is in a range of from about 2/1 to about 1/8, and
  (3) a coupling agent having a moiety reactive with hydroxyl groups (e.g. silanol groups) contained on the surface of said silica and another moiety interactive with said diene-based elastomer(s);

(C) said central tread cap zone is comprised of a silica-rich, carbon black-containing, rubber composition positioned between said lateral zones; wherein said central tread cap zone rubber composition is comprised of:
  (1) 100 phr of diene-based elastomers having a Tg in a range of from about −110° C. to about +20° C., wherein from about 50 to about 90 phr of said elastomers have a Tg above −50° C.;
  (2) about 40 to about 100 phr of reinforcing filler comprised of about 40 to about 100, alternately about 30 to about 70, phr precipitated silica and from zero to about 40, alternately about 10 to about 30, phr of rubber reinforcing carbon black, wherein the weight ratio of silica to carbon black, when said carbon black is present, is in a range between 8/1 to 1/1 (thus the silica is in the majority insofar as silica and carbon black are concerned);
  (3) a coupling agent having a moiety reactive with hydroxyl groups (e.g. silanol groups) contained on the surface of said silica and another moiety interactive with said diene-based elastomer(s);

wherein said rubber composition of said lateral tread cap zones has low strain modulus G' value at 10 percent shear strain at 30° C. and 10 Hertz in a range of about 5 to about 50 MPa, a DIN 53516 relative abrasion value (23° C., at 2.5 Newtons load) in a range of about 30 to about 100 and a tan delta value at 0° C. in a range of from 0.05 to about 0.12; and wherein said rubber composition of said central tread cap zone has low strain modulus G' at 10 percent shear strain at 30° C. and 10 Hertz in a range of about 2 to about 30 MPa and at least 10 percent lower than the low strain G' modulus of said lateral tread cap zones, a DIN 53516 relative abrasion value (23° C., at 2.5 Newtons load) in a range of about 100 to about 200, and a tan delta value at 0° C. in a range of from 0.12 to about 0.50.

The DIN relative abrasion value, as would be understood by one having skill in such art, is a ratio of an abrasion loss of a rubber sample to an abrasion loss of a control rubber sample specified by the DIN 53516 test. Therefore, in comparing two rubber samples, a lower relative abrasion value represents greater resistance to abrasion loss (e.g. a rubber sample having a DIN relative abrasion value of 50 has a greater resistance to abrasion than a rubber sample having a DIN relative abrasion value of 150).

In one aspect of the invention, the said lateral tread zones, central tread zone and underlying tread base are co-extruded together to form an integral and unified tread composite thereof.

In practice, said two individual lateral tread zones may be of equal widths, or at least of substantially equal widths, or may be asymmetrical in a sense that they are of unequal widths, namely of widths within about 80 to about 120 percent of each other.

A significant aspect of the invention is the significantly transversally (axially) wide individual circumferential load bearing tread cap zones which extend radially from the tread cap running surface to the underlying, supportive tread base layer rather than more simply only extending directly to the tire carcass and particularly only to a tire carcass belt layer.

In one aspect of the invention, the span of the running surface of the tread cap layer includes the outer surface of the tread lugs intended to be ground contacting and the included grooves between the lugs. In another aspect of the invention, the span of the running surface of the tread cap layer is exclusive of the tire sidewall.

A significant aspect of the invention is the purposeful and intended imbalance of said low strain modulus G', DIN abrasion values and tan delta values at 0° C. between said lateral tread cap zone rubber compositions and said central tread cap zone rubber composition wherein said lateral tread cap zones having a significantly lower DIN abrasion value and with said central zone having lower low strain modulus G' and higher tan delta at 0° C. value.

The higher resistance to abrasion DIN abrasion values (reduced cc loss) of the lateral tread cap zones is promoted by the rubber composition being comprised of low Tg elastomers and particularly the use of at least 50 phr of the cis 1,4-polybutadiene rubber. The higher tan delta (0° C.) value of the central tread cap zone is promoted by use of the higher Tg elastomers having a Tg higher than −50° C.

Accordingly, the tread cap is provided with said three distinct zones, namely two lateral zones having resistance to abrasion promoted by use of low Tg elastomers and higher low strain shear modulus G' and a central zone for which it is desired to promote traction for the tread promoted by higher Tg elastomers and reduced low shear strain modulus G'.

In turn, it is contemplated that traction (skid resistance) of said central tread cap zone is significantly higher than the lateral tread cap zones and resistance to abrasion, or treadwear, is significantly higher for said lateral tread cap zones than said central tread cap zone.

It is to be appreciated that one having skill in rubber compounding for tire treads can readily provide the tread zones with the indicated rubber composition properties with routine experimentation and without undue experimentation.

Therefore, the invention is directed to a structural configuration of a tire tread combined with distinct, zoned, individual rubber compositions for the running surface of the tread.

Providing the tread cap zones with the low strain modulus G' value in a range of from about 3 to about 30 MPa for the central zone and from 5 to about 50 MPa for the lateral zones is considered herein to be significant because it is considered herein as representing a rubber composition to promote handling and resistance to wear for the lateral zones of a tire tread cap rubber composition and traction for the central tread cap zone.

Providing a tread cap zone with the tan delta value at a low 10 percent strain at 10 hertz at 0° C. in a range of about 0.12 to about 0.50 is considered herein as being significant because it is considered herein as representing a rubber composition to promote traction of a tire tread cap rubber composition.

For the purposes of this invention the, low shear modulus property G' is a viscoelastic property of a rubber composition which may be determined by a Rheometrics Dynamic Spectrometer instrument of the Rheometrics company as RDS 7700 Series II (referred to herein as an "RDS" instrument). The RDS instrument uses dynamic mechanical analysis to evaluate rubber compositions. A sinusoidally oscillating shear deformation is used as an operating mode. A sample of the respective rubber composition is subjected to a precisely controlled deformation (10 percent strain), frequency (10 Hertz) and temperature (30° C.) and the sample stress response is observed by the instrument. The observed sample response can be separated, by the instrument, into viscous (G") and elastic (G') components. For the purposes of this specification, the aforesaid testing conditions for the instrument were 10 percent strain, 10 Hertz and 30° C. to define the G' elastic low shear property in terms of MPa.

One having skill in the pertinent art would understand how to provide rubber compositions of various low shear properties (at 10 percent strain at 10 Hertz at 30° C.) pursuant to the requirements of the tread cap zone rubber composition for this invention composed of the aforesaid elastomers and reinforcing fillers with routine experimentation and without undue experimentation.

For the purposes of this invention, the tan delta property may also be determined by the RDS instrument pursuant to the requirements of the tread cap zone rubber composition for this invention composed of the aforesaid elastomers and reinforcing fillers with routine experimentation and without undue experimentation.

For a further understanding of this invention, FIG. 1 (FIG. 1) is provided as a partial cross-sectional view of a tire having a tread of a cap/base construction.

FIG. 1 depicts a tire (1) having a tread (2) comprised of a tread cap layer (3) of a lug (4) and groove (5) construction and underlying tread base layer (8) as a transition zone between said tread cap layer (3) and remainder of the tire carcass plies (11) and rubber encapsulated belt layer (12); spaced apart relatively inextensible beads (9) carcass plies as rubber encapsulated fabric reinforced plies extending between said beads (9) and sidewalls (10) extending between said beads (9) and peripheral edges of said tread (2) as well as a rubber innerliner layer (13).

Said tread cap layer (3) is comprised of three annular, circumferential zones of rubber compositions is comprised of a central zone (6) positioned between two individual lateral zones (7).

The three zones of the cap layer (3) also extend radially inward from the running surface (14—14) which is the spanned region (15) of the tread cap layer (3) to the transition, intervening, tread base layer (8) and not to the remainder of the carcass plies (11) or carcass belt layer (12).

In particular, said central zone (6) and lateral zones (7) constitute the running surface of the tire normally intended to be ground contacting and normally extending between position (14—14) as illustrated as spanning the region (15) of the tread cap layer (3). In particular, for the purposes of this invention in order to more effectively describe and allocate the central zone (6) and lateral zones (7) of the tread cap layer (3), the running surface of the tire tread, to include the central zone (6) and lateral zones (7) is therefore intended to be the spanned region (15) to span across (include) the outer surfaces of the lugs (4) which are intended to be ground contacting and the associated grooves (5) between the respective lugs (4) even though the grooves (5) themselves are not normally intended to be ground contacting.

For FIG. 1, the central zone (6) is depicted as constituting about 60 percent of the spanned running surface (15) of the tire tread (2) and the two individual lateral zones (7) individually constituting about 20 percent, for a total of 40 percent, of the spanned running surface (15) of the tire tread (2).

In practice, the tread cap zone layers may be comprised of the same or different elastomers, so long as, however, the Tg requirements of the elastomers for the respective tread cap zones are met, in combination with the aforesaid carbon black and precipitated silica reinforcing fillers, so long as the aforesaid combination of low strain modulus G' at 30° C. and tan delta at 0° C. ranges of rubber property values are met.

Preferably, the tread cap central zone layer is comprised of at least two elastomers wherein the elastomers are comprised of at least one high Tg elastomer having a Tg above −50° C. and at least one low Tg elastomer having a Tg below −50° C. Preferably the weight ratio of elastomers having a high Tg above −50° C. to low Tg elastomers having a Tg below −50° C. is greater than 1/1. Preferably the tread cap lateral zones are comprised of at least one low Tg (below −50° C.) elastomer.

Representative of such low Tg (below −50° C.) conjugated diene elastomers which can also be used for the tread cap lateral and central zones, are, for example and so long as they have a Tg below −50° C. are, for example, cis 1,4-polybutadiene, cis 1,4-polyisoprene, styrene/butadiene (whether prepared by emulsion polymerization or organic solvent polymerization of the styrene and 1,3-butadiene monomers), and isoprene/butadiene elastomers. Such elastomers are usually beneficial to promote resistance to tread wear and reduced rolling resistance for the tire tread.

Representative of such higher Tg conjugated diene elastomers for the tread cap central zone are, for example and so long as they have a Tg higher than −50° C. are, for example, high vinyl polybutadiene elastomers having a vinyl content in a range of about 30 to about 90 percent, 3,4-polyisoprene, high vinyl styrene/butadiene elastomers having a vinyl content in a range of about 30 to about 70 percent, based upon the butadiene content and high styrene styrene/butadiene elastomers having a bound styrene content in a range of about 30 to about 55 percent based upon the styrene/butadiene elastomer. Such elastomers are usually beneficial to promote traction for the tire tread.

In practice, the tread base layer is preferably primarily comprised of either cis 1,4-polyisoprene rubber, preferably natural rubber, or a combination of the cis 1,4-polyisoprene rubber and a polybutadiene rubber selected from cis 1,4-polybutadiene rubber and trans 1,4-polybutadiene rubber. Optionally, also it may also contain up to about 20 phr (e.g. from about 5 to about 15 phr) of at least one additional conjugated diene based elastomer such as, for example, at least one additional diene-based elastomer selected from at least one of styrene/butadiene rubber, isoprene/butadiene rubber, trans 1,4-polybutadiene, low vinyl polybutadiene having vinyl content in a range of 10 to about 40 percent, and styrene/isoprene/butadiene rubber, preferably a styrene/butadiene copolymer rubber.

In practice, the coupling agent for the respective zones of the tread may be, for example, an alkoxysilyl polysulfide such as for example, a bis(3-trialkoxysilylalkyl) polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or an average of from 3.5 to 4, connecting sulfur atoms in its polysulfidic bridge, preferably an average of from 2 to 2.6 connecting sulfur atoms to the exclusion of such polysulfides having greater than 2.6 connecting sulfur atoms.

Representative of such coupling agents are, for example, bis(3-triethoxysilylpropyl) polysulfide having an average of from 2 to 2.6 or an average of from 3.5 to 4, connecting sulfur atoms in its polysulfidic bridge, preferably an average of from 2 to 2.6 connecting sulfur atoms to the exclusion of a bis(3-teiethoxysilanepropyl) polysulfide containing an average of greater than 2.6 connecting sulfur atoms in its polysulfidic bridge.

Such coupling agent may, for example, be added directly to the elastomer mixture or may be added as a composite of precipitated silica and such coupling agent formed by treating a precipitated silica therewith or by treating a colloidal silica therewith and precipitating the resulting composite.

In practice, the synthetic amorphous silica may be selected from aggregates of precipitated silica, which is intended to include precipitated aluminosilicates as a co-precipitated silica and aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165 MP and Zeosil 165GR, silicas from J. M. Huber Corporation as, for example, Zeopol 8745 and Zeopol 8715, silicas from Degussa AG with, for example, designations VN2, VN3 and Ultrasil 7005 as well as other grades of silica, particularly precipitated silicas, which can be used for elastomer reinforcement.

Representative examples of other silica couplers may be organomercaptosilanes such as, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

In practice, the invention the rubber compositions may be prepared in a sequential series of at least two separate and individual preparatory internal rubber mixing steps, or stages, in which the diene-based elastomer is first mixed with the prescribed carbon black and/or silica in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature of less than 40° C. and, for example, in a range of about 40° C. to about 20° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least three stages, namely, at least two non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a rubber tread of a co-extruded cap/base layered construction, wherein said tread cap layer is of a lug and groove configuration as a running surface of the tread, wherein said tread base layer underlies said tread cap and is comprised of a carbon black-rich rubber composition and wherein said tread cap is comprised of three distinct, circumferential zones, wherein said tread cap zones are comprised of a central tread zone positioned between two lateral tread zones, wherein said tread zones extend radially inward from the running surface of the tread to said tread base layer, wherein, based upon parts by weight per 100 parts by weight rubber (phr)

(A) said tread base layer is comprised of at least one conjugated diene-based elastomer and from about 30 to about 70 phr of rubber reinforcing filler selected from carbon black and precipitated silica wherein said filler is comprised of from about 30 to about 70 phr of said carbon black and from zero to 25 phr of said precipitated silica, and wherein (B) said lateral tread cap zones are comprised of:
 (1) 100 phr of at least one diene-based elastomers having a Tg between+50° C. and −110° C. and exclusive of elastomers having a Tg higher than −50° C., wherein said elastomers comprised of from 50 to 90phr of cis 1,4-polybutadiene rubber, from 10 to 50 phr of cis 1,4-polyisoprene rubber, preferably natural cis 1,4-polyisoprene rubber; and from zero to 20 phr of at least one additional diene-based elastomer selected from at least one of styrene/butadiene rubber, isoprene/butadiene rubber, trans 1,4-polybutadiene, low vinyl polybutadiene having vinyl content in a range of 10 to about 40 percent, and styrene/isoprene/butadiene rubber, so long as said additional elastomers have a Tg within a range of −50° C. and −110° C.;
 (2) about 30 to about 100 phr of reinforcing filler comprised of about 20 to about 80 phr of rubber reinforcing carbon black and from 10 to about 40 phr of precipitated silica, wherein the weight ratio of silica to carbon black is in a range of from about 2/1 to about 1/8, and
 (3) a coupling agent having a moiety reactive with hydroxyl groups contained on the surface of said silica and another moiety interactive with said diene-based elastomer(s);

(C) said central tread cap zone is comprised of a rubber composition positioned between said lateral zones; wherein said central tread cap zone rubber composition is comprised of:
 (1) 100 phr of diene-based elastomers having a Tg in a range of from about −110° C. to about +20° C., wherein from about 50 to about 90 phr of said elastomers have a Tg above −50° C. and below about +20° C.;
 (2) about 40 to about 100 phr of reinforcing filler comprised of about 30 to about 70 phr precipitated silica and from about 10 to about 30 phr of rubber reinforcing carbon black;
 (3) a coupling agent having a moiety reactive with hydroxyl groups contained on the surface of said silica and another moiety interactive with said diene-based elastomer(s);

wherein said rubber composition of said lateral tread cap zones has low strain modulus G' value at 10 percent shear strain at 30° C. and 10 Hertz in a range of about 5 to about 50 MPa, a DIN 53516 relative abrasion value (23° C., at 2.5 Newtons load) in a range of about 30 to about 100 and a tan delta value at 0° C. in a range of from 0.05 to about 0.12; and wherein said rubber composition of said central tread cap zone has low strain modulus G' at 10 percent shear strain at 30° C. and 10 Hertz in a range of about 2 to about 30 MPa and at least 10 percent lower than the low strain G' modulus of said lateral tread cap zones, a DIN 53516 relative abrasion value (23° C., at 2.5 Newtons load) in a range of about 100 to about 200, and a tan delta value at 0° C. in a range of from 0.12 to about 0.50.

2. The tire of claim 1 wherein the span of the running surface of said tread cap layer includes the outer surface of the tread lugs intended to be ground contacting and the included grooves between the lugs and wherein said span of the running surface of the tread cap layer is exclusive of the tire sidewall.

3. The tire of claim 1 wherein the said reinforcing filler of said tread base layer is said carbon black.

4. The tire of claim 1 wherein the said reinforcing filler of said tread base layer is comprised of from about 25 to about 65 phr of said carbon black and from about 5 to about 20 phr of said precipitated silica.

5. The tire of claim 1 wherein said two individual lateral tread cap zones are of substantially equal widths.

6. The tire of claim 1 wherein said two individual lateral tread cap zones are widths within about 80 to about 120 percent of each other.

7. The tire of claim 1 wherein said tread base layer rubber composition is comprised of carbon black as a reinforcing filler and:

(A) cis 1,4-polyisoprene rubber, or (B) blend of cis 1,4-polyisoprene rubber and polybutadiene rubber selected from at least one of cis 1,4-polybutadiene rubber having a cis 1,4-content of greater than 90 percent, and trans 1,4-polybutadiene rubber having a trans 1,4- content of greater than 50 percent, in a weight ratio of cis 1,4-polyisoprene rubber to said polybutadiene rubber in a range of from about 20/80 to about 80/20, and, optionally;

(C) from about 5 to about 15 phr of at least one additional diene-based elastomer selected from at least one of styrene/butadiene rubber, isoprene/butadiene rubber, trans 1,4-polybutadiene, low vinyl polybutadiene having vinyl content in a range of 10 to about 40 percent, and styrene/isoprene/butadiene rubber, so long as said additional diene-based elastomer(s) have a Tg within a range of −50° C. and −110° C.

8. The tire of claim 7 wherein the rubber of said tread base rubber composition is natural cis 1,4-polyisoprene rubber.

9. The tire of claim 7 wherein the rubber of said tread base rubber composition is a blend of cis 1,4-polyisoprene rubber and at least one of cis 1,4-polybutadiene rubber and trans 1,4-polybutadiene rubber.

10. The tire of claim 7 where said tread base rubber composition contains from about 5 to about 15 phr of at least one additional diene-based elastomer selected from at least one of styrene/butadiene rubber, isoprene/butadiene rubber, trans 1,4-polybutadiene, low vinyl polybutadiene having vinyl content in a range of 10 to about 40 percent, and styrene/isoprene/butadiene rubber.

11. The tire of claim 1 wherein said tread cap central zone layer is comprised of at least two elastomers wherein the elastomers are comprised of at least one high Tg elastomer having a Tg above −50° C. and at least one low Tg elastomer having a Tg below −50° C.

12. The tire of claim 11 wherein, for said tread cap central zone, the weight ratio of elastomers having a high Tg above −50° C. to low Tg elastomers having a Tg below −50° C. is greater than 1/1.

13. The tire of claim 1 wherein said tread cap central zone is comprised of at least two elastomers wherein the elastomers are comprised of at least one high Tg elastomer having a Tg above −50° C. and at least one low Tg elastomer having a Tg below −50° C., wherein said low Tg conjugated diene elastomers are selected from, so long as they have a Tg below −50° C., at least one of cis 1,4-polybutadiene, cis 1,4-polyisoprene, styrene/butadiene, and isoprene/butadiene elastomers and said high Tg diene based elastomers are, so long as they have a Tg higher than −50° C., selected from at least one of high vinyl polybutadiene elastomers having a vinyl content in a range of about 30 to about 90 percent, 3,4-polyisoprene, high vinyl styrene/butadiene elastomers having a vinyl content in a range of about 30 to about 70 percent, based upon the butadiene content and high styrene styrene/butadiene elastomers having a bound styrene content in a range of about 30 to about 55 percent based upon the styrene/butadiene elastomer.

14. The tire of claim 1 wherein said tread cap lateral zone layers are comprised of at least one elastomer selected from, so long as it has a Tg below −50° C., at least one of cis 1,4-polybutadiene, cis 1,4-polyisoprene, styrene/butadiene, and isoprene/butadiene elastomers.

15. The tire of claim 13 wherein said tread cap lateral zone layers are comprised of at least one elastomer selected from, so long as it has a Tg below −50° C., at least one of cis 1,4-polybutadiene, cis 1,4-polyisoprene, styrene/butadiene, and isoprene/butadiene elastomers.

16. The tire of claim 1 wherein said coupling agent for the respective tread cap zones is a bis(3-trialkoxysilylalkyl) polysulfide wherein alkyl radicals for said alkoxy groups are selected from one or more of methyl and ethyl radicals, preferably an ethyl radical and the alkyl radical for said silylalkyl component is selected from butyl, propyl and amyl radicals.

17. The tire of claim 1 wherein said coupling agent is a bis(3-triethoxysilylpropyl) polysulfide wherein said polysulfide component contains from 2 to 8, with an average of from 2 to 2.6 or an average of from 3.5 to 4, connecting sulfur atoms in its polysulfidic bridge.

18. The tire of claim 1 wherein said coupling agent is comprised of a bis(3-triethoxysilylpropyl) polysulfide wherein said polysulfide component contains an average of from 2 to 2.6 connecting sulfur atoms in its polysulfidic bridge, and wherein said coupling agent is added to the elastomer mixture as a composite of precipitated silica and said coupling agent formed by treating colloidal or precipitated silica therewith.

19. The tire of claim 2 wherein:
(A) said coupling agent is a bis(3-triethoxysilylpropyl) polysulfide wherein said polysulfide component contains an average of from 2 to 2.6 connecting sulfur atoms in its polysulfidic bridge;
(B) said tread base layer is comprised of natural cis 1,4-polyisoprene rubber and carbon black reinforcing filler;
(C) said tread cap central zone is comprised of
  (1) at least two elastomers wherein the elastomers are comprised of at least one high Tg elastomer having a Tg above −50° C. and at least one low Tg elastomer having a Tg below −50° C., wherein said low Tg conjugated diene elastomers are selected from, so long as they have a Tg below −50° C., at least one of cis 1,4-polybutadiene, cis 1,4-polyisoprene, styrene/butadiene, and isoprene/butadiene elastomers and said high Tg diene based elastomers are, so long as they have a Tg higher than −50° C., selected from at least one of high vinyl polybutadiene elastomers having a vinyl content in a range of about 30 to about 90 percent, 3,4-polyisoprene, high vinyl styrene/butadiene elastomers having a vinyl content in a range of about 30 to about 70 percent, based upon the butadiene content and high styrene styrene/butadiene elastomers having a bound styrene content in a range of about 30 to about 55 percent based upon the styrene/butadiene elastomer, and
  (2) said reinforcing filler of said central tread cap zone is comprised of about 30 to about 70 phr of precipitated silica and between 10 to 30 phr of said carbon black; and
(D) said tread cap lateral zones are comprised of at least one elastomer selected from, so long as it has a Tg below −50° C., cis 1,4-polybutadiene, cis 1,4-polyisoprene, styrene/butadiene, and isoprene/butadiene elastomers.

* * * * *

UNITED STATES PATENT AND TRADEMARK OFFICE
CERTIFICATE OF CORRECTION

PATENT NO. : 6,959,744 B2
DATED : November 1, 2005
INVENTOR(S) : Paul Harry Sandstrom et al.

It is certified that error appears in the above-identified patent and that said Letters Patent is hereby corrected as shown below:

Column 11,
Lines 45-48, delete "(1) 100 phr of at least one diene-based elastomers having a Tg between +50°C and -100°C and exclusive of elastomers having a Tg higher than -50°C, wherein" and substitute -- (1) 100 phr of at least one diene-based elastomers having a Tg between -50°C and -100°C and exclusive of elastomers having a Tg higher than -50°C, wherein --.

Signed and Sealed this

Tenth Day of January, 2006

JON W. DUDAS
*Director of the United States Patent and Trademark Office*